Oct. 14, 1941.    W. F. BANNISTER    2,258,727
DRILL GRINDING APPARATUS
Filed April 17, 1939    3 Sheets-Sheet 1
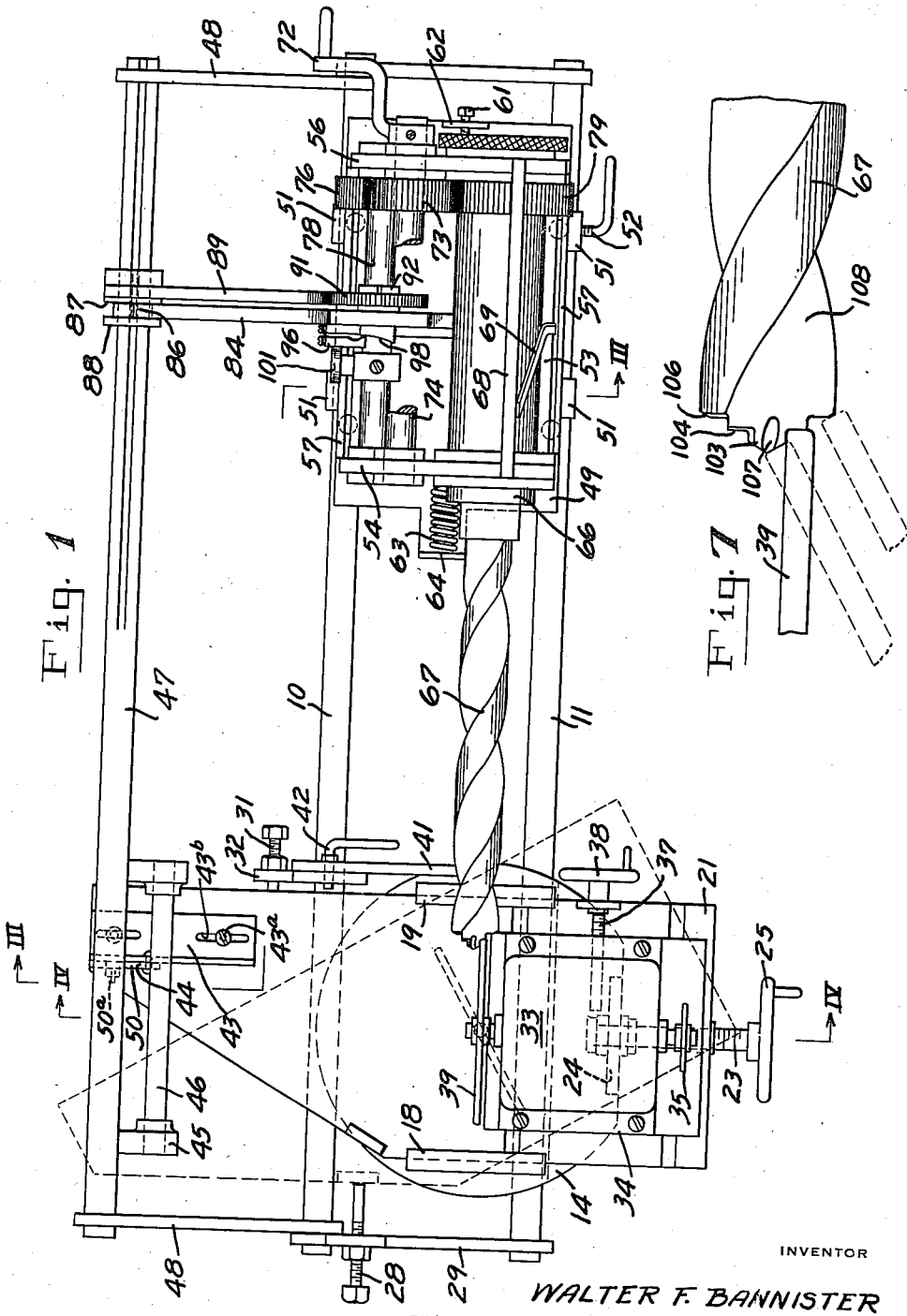
INVENTOR
WALTER F. BANNISTER
BY
Johnston & Jennings
ATTORNEYS

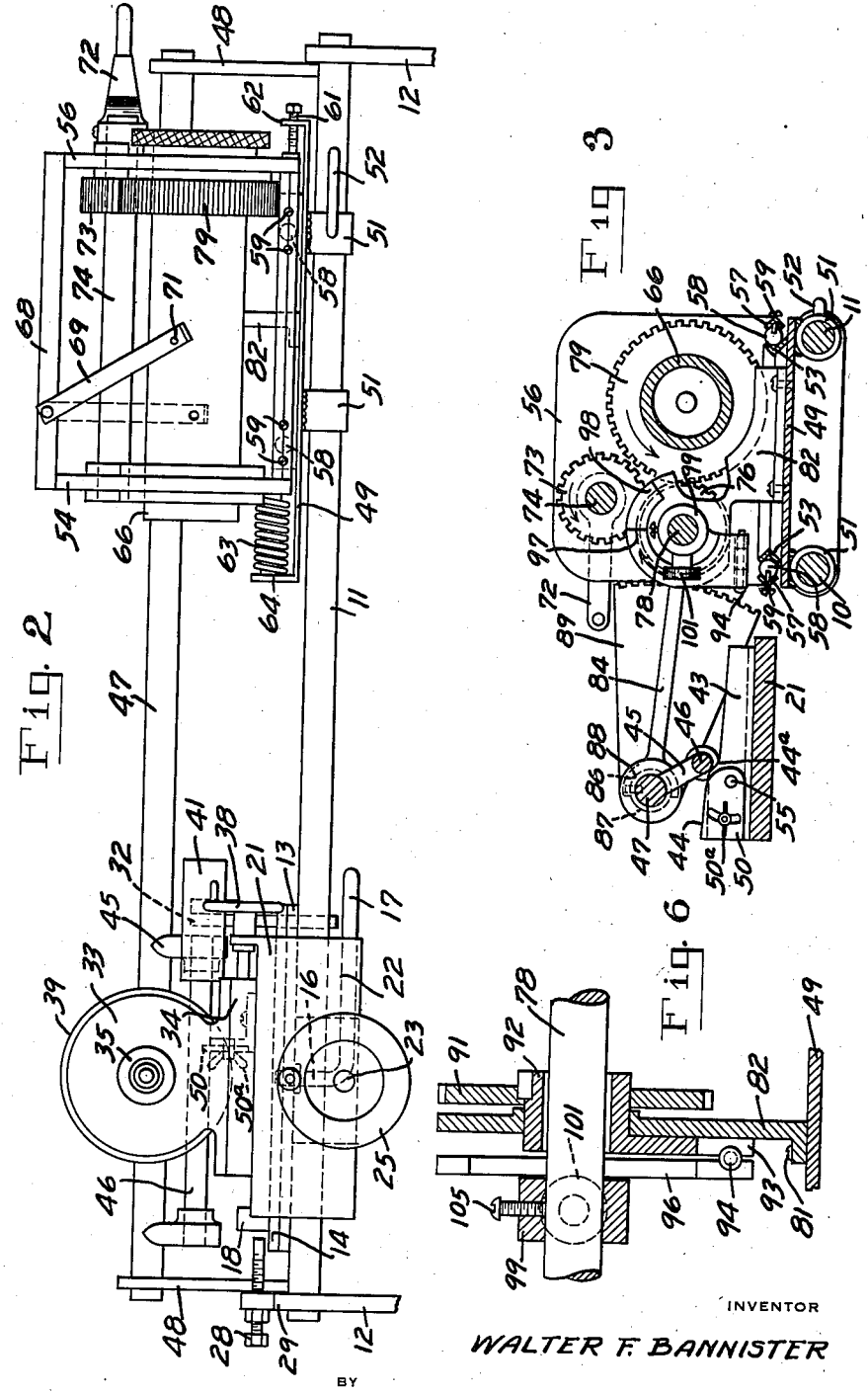

Oct. 14, 1941.    W. F. BANNISTER    2,258,727
DRILL GRINDING APPARATUS
Filed April 17, 1939    3 Sheets-Sheet 3

INVENTOR
WALTER F. BANNISTER
BY
Johnston & Jennings
ATTORNEYS

Patented Oct. 14, 1941

2,258,727

UNITED STATES PATENT OFFICE 2,258,727

DRILL GRINDING APPARATUS

Walter F. Bannister, Birmingham, Ala., assignor of forty-nine per cent to Herbert G. Hard, Birmingham, Ala.

Application April 17, 1939, Serial No. 268,240

9 Claims. (Cl. 51—219)

My invention relates to apparatus for grinding twist drills and has for its principal objects the provision of apparatus adapted for the grinding of drills having a plurality of steps or cutting edges; to provide grinding apparatus of the character designated embodying means to effect the grinding automatically of drill points having uniformly increasing axial clearance from the center of the drill outwards; to provide means, in drill grinding apparatus, insuring uniformity of grinding of all the cutting edges of the drill; and to provide in such apparatus an automatically variable cam motion for effecting the shifting of the drill point as it is being ground.

In my Patent No. 2,193,186, granted March 12, 1940, and relating to twist drills, there is shown, described and claimed a twist drill embodying a plurality of drilling units, the first having a core of minimum area to reduce to a minimum the metal to be crushed during the drilling operation, and having auxiliary flutes merging into the larger or main flutes of the drill. In accordance with said application, part of the cutting edges were normal to the axis of the drill and part inclined to the axis of the drill. The apparatus of this application is particularly adapted for grinding drills such as described in my previously filed application, though it will be apparent that it is adapted for grinding twist drills embodying only a single cutting unit.

Briefly, my invention comprises a suitable bed including parallel side frame members. On one end of the frame is secured a bed plate, and on the bed plate is mounted a base plate which is adjustable angularly with respect to the bed plate. Mounted on the base plate, is a motor carriage on which is mounted a motor having a grinding wheel directly connected, the motor carriage being adjustable transversely of the bed and the motor being adjustable on the motor carriage longitudinally of the bed. At the other end of the frame is provided a drill feed mechanism comprising a slide movable longitudinally of the frame and adjustable with respect thereto. On the slide is mounted, by means of ball bearings and adapted for limited longitudinal movement with respect thereto, a carriage carrying a drill holder and its operating mechanism. The carriage is biased away from the grinding wheel by means of a spring and is adjustably limited in its movement on the slide away from the grinding wheel. Secured to the slide is a variable cam member which controls the axial movement of the carriage with the drill toward the grinding wheel as it is being ground. The throw of the cam, and consequently the extent of axial movement produced thereby, is controlled by the position of the grinding wheel radially with respect to the drill point; the farther the grinding wheel radially of the axis of the drill being ground, the greater the axial movement of the drill as it is being ground and the greater the axial clearance. A feature of my improved grinding machine is that the grinding of both cutting edges of the drill is controlled by a single cam so that both sides are ground identically and there is no unequal strain on the cutting edges of the drill when in service.

The foregoing and other features of my invention are illustrated in the accompanying drawings forming a part of this application, in which Fig. 1 is a plan view of my improved drill grinding machine;

Fig. 2 is a side elevation thereof;

Fig. 3 is a sectional view taken along the line III—III of Fig. 1;

Fig. 6 is a sectional view taken on the line VI—VI of Fig. 5; and

Fig. 7 is an enlarged view of the point of the drill showing the various positions of the grinding wheel with respect to the drill as it is being ground.

Figure 5:
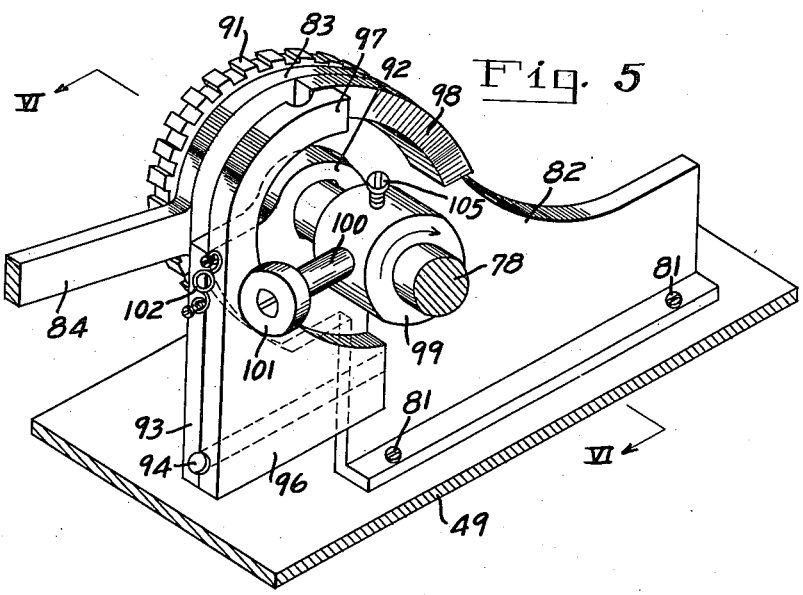
Fig. 5 is a perspective view of the cam mechanism employed to control the axial feed of the drill being ground.

Referring to the drawings, I show a bed comprising side frame members 10 and 11 supported at the ends by suitable legs 12. At one end of the bed there is mounted a bed plate 13, rigidly secured to the side frame members 10 and 11, as by welding. See Fig. 4. Mounted on the bed plate 13 is a base plate 14, being attached thereto by means of an adjusting bolt 16, manually tightened and loosened by means of a crank arm 17, whereby the base plate is angularly adjustable with respect to the bed plate.

The base plate 14 is provided with lateral guides 18 and 19, between which is mounted a motor carriage 21. The motor carriage has a depending flange 22 through which an adjusting screw 23 passes and which extends through the depending flange 24 on the base plate 14, being operated by a hand wheel 25. Collars 26 and 27 on the screw 23 on opposite sides of the flange 24 provide for lateral adjustment of the motor carriage 21 with respect to the bed. As will be seen, the motor carriage 21 moves angularly with the base plate 14 so that it is angularly adjustable with respect to the bed plate. The extent of angular movement of the carriage 21 is limited by means of an adjustable stop 28 carried by an end frame member 29, and by an adjustable stop 31 carried by an upright 32 secured to and extending upwardly from the frame member 10.

Mounted on the carriage 21 is a motor 33 having a base 34 carrying slides 36 mounted in complemental grooves in the motor carriage 21. The motor 33 is adjustable transversely of the motor carriage 21 by means of an adjusting screw 37 and hand wheel 38. Directly driven by the motor 33 at one end is a grinding wheel 39, which is preferably a narrow faced wheel as shown for grinding the drill point, and at the other end a smaller wheel 35 for grinding auxiliary flutes, as hereinafter described. A steady rest 41 for supporting drills to be ground against vibration is carried by the upright 32, and its position may be adjusted by means of a manually operable screw 42.

Figure 4:
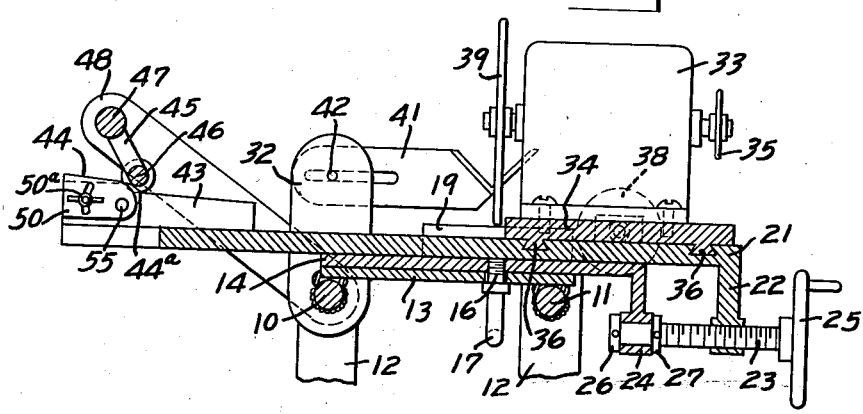
Fig. 4 is a sectional view taken on the line IV—IV of Fig. 1.

The motor carriage 21, as may be seen in Fig. 4, extends across the bed and on its side opposite the motor 33 carries a cam member 43 having an inclined cam surface 44, and a more abrupt upwardly curved surface 44a. Bearing on the cam 43 is a yoke 45 carrying an elongated roller 46. The yoke 45 is mounted on a shaft 47 extending longitudinally of the apparatus, which shaft is adapted to oscillate in upwardly inclined arms 48 carried at the ends of the frame and rigidly secured thereto. The yoke 45 is made of sufficient length so that the rollers 46 contacts with the cam 44 in whatever angular position of the motor carriage 21. Also, the motor carriage 21 is made of sufficient length so that the angular adjustment thereof, as hereinafter seen, does not materially affect the angular position of the yoke 45 with respect to the cam 44.

As will also be seen from Figs. 1 and 4, the outer end of the cam member 43 is made in two parts, one part 50 being pivoted at 55 and held in adjusted position by means of an adjusting screw 50a and adapted to form the upper inclined surface 44. There is thus provided a means whereby the angle of inclination of the surface 44 may be varied, the effect of which is to vary the angle of axial clearance of the cutting edges of the drill, as will be seen by further reference to this specification. The position of the cam 43 is adjustable on the bed by means of adjusting screws 43a positioned in slots 43b in the cam.

Mounted on the frame members 10 and 11, and movable with respect thereto, is a slide 49. Sleeves 51 are secured to the slide 49, as by welding, and surround the frame members 10 and 11. A manually operable screw 52, passing through one of the sleeves 51, serves as a means for firmly anchoring the slide with respect to the frame members 10 and 11 in any desired position. Extending longitudinally of the slide 49 along each side thereof and secured thereto, as by welding, is one-half of a ball race 53, which may conveniently be made of angle members, as shown. A carriage frame having end members 54 and 56 has secured thereto at the bottom, and extending longitudinally thereof, angle members 57 which form the outer portion of a ball race cooperating with the inner race 53. Ball bearings 58 are carried between the cooperating races and are limited in their movement by means of screws 59 extending through the outer race members 57. The carriage is thus mounted for longitudinal movement on the slide 49 by means of the frictionless bearings, so that it is adapted for the ready movement thereof, hereinafter described.

The movement of the carriage frame away from the grinding wheel is limited by means of an adjusting screw 61 passing through an upturned bracket member 62 carried by the slide and bearing against the end frame member 56. At the opposite end of the carriage, a spring 63 bears against an upturned flange 64 carried by the slide and against the end frame member 54, to bias the carriage frame away from the grinding wheel 39.

Mounted for rotation in suitable bearings in the end frame members 54 and 56 is a rotary drill holder 66 adapted to hold a drill 67 to be ground. A member 68 extends longitudinally of the carriage and is joined to the upper ends of the end frame members 54 and 56. An arm 69, pivotally mounted on the member 68, is provided with a screw 71 adapted to fit into a corresponding recess in the side of the drill holder 66 to set the drill holder in its proper starting position when mounting a drill therein to be ground. In that position, the drill 67 is placed as shown in Fig. 1, with the sides of the main flutes uppermost in a horizontal position at the drill point.

The drill holder is driven by any suitable means and in the embodiment herein illustrated is shown as being driven manually by a crank 72 driving a gear 73 mounted on a shaft 74 extending longitudinally of the carriage and mounted in suitable bearings in the end members 54 and 56. The gear 73 meshes with a gear 76 mounted on a countershaft 78, and the gear 76 in turn meshes with a gear 79 of twice the diameter so that the countershaft 78 makes two revolutions for one of the drill holder 66 and drill 67. The countershaft 78 is also mounted in suitable bearings carried by the end members 54 and 56.

Fixedly secured to the slide 49, as by means of screws 81, is a plate 82 having an upwardly curved portion 83, through which the shaft 78 extends. Integral with the plate 82 is a rigid arm 84 which extends outwardly, terminating in a fork 86 which rides in a groove 87 formed in a collar 88 splined to the shaft 47 so as to be readily movable longitudinally of the shaft, but which oscillates with the shaft. Mounted rigidly with the collar 88 is a segmental gear 89 which meshes with a gear 91 which is mounted on a hub 92 journalled in the plate 82 and surrounding the shaft 78, but having clearance with respect to the shaft, as shown in Figs. 5 and 6.

The hub 92 has a downwardly depending portion 93 on the opposite side of the yoke 82 from the gear 91. Pivotally mounted at the bottom of the downwardly depending portion 93 by a hinge pin 94 is a cam member 96, the upper end of which, at 97, bears against an inclined surface 98 integral with the plate 82, as best seen in Fig. 5. It will be seen from Fig. 5 that as the gear 91 is oscillated about the hub 92, it oscillates the cam member 96, varying its throw with respect to the shaft 78.

Adjustably mounted on the shaft 78 is a collar 99 carrying a roller shaft 100 on which is mounted a roller 101 which bears against the cam member 96 as the shaft 78 rotates. The shaft 78 is mounted in bearings carried by the end members 54 and 56 of the carriage, and as it rotates carrying the roller 101, the latter bears against the cam 96, and pushes the shaft 78 with the carriage and drill holder 66 toward the grinding wheel 39. The drill 67 is thus fed axially toward the grinding wheel. As soon as the roller 101 rolls off the upper end of the cam 97, the spring 63 suddenly pushes the carriage away from the grinding wheel 39, and withdraws the drill 67 axially from engagement therewith. Inasmuch as the shaft 78 rotates twice to one rotation for the drill holder 66, it will be seen that the grinding of the two sides of the drill is controlled by the single cam member 96 and that the two sides are thus ground uniformly. Also, it will be seen that the inclination of the cam 96 controls the amount of movement of the drill 67 toward the grinding wheel 39 and therefore directly controls the axial clearance of the cutting edges of the drill. This control is modified by the inclination of the surfaces 44 and 44a which control the position of the cam member 96 with respect to the inclined surface 98.

As before stated, the starting position for grinding a drill is as shown in Fig. 1, in which position the roller 101 is ready to engage the cam 96 to feed the drill point toward the grinding wheel. The initial engagement of the roller 101 with respect to the cam 96 may be adjusted by means of the set screw 105 controlling the position of the roller shaft 100; and also by the set screw 61 controlling the backward movement of the drill holder.

As the position of the motor carriage 21 is adjusted by means of the hand wheel 25, it moves the motor carriage transversely of the bed 13 and moves the grinding wheel 39 radially of the drill point being ground. As the carriage is shifted, it shifts the position of the cam member 43 and effects angular movement of the shaft 47 in its supporting arms 48. As the shaft 47 moves angularly, it moves the segmental gear 89 which, meshing with the gear 91 mounted on the hub 92, effects angular movement of the cam 96. When the roller 46 is raised up responsive to outward movement of the grinding wheel with respect to the drill, the segmental gear 89 imparts angular motion to the cam member 96, as just described, in a clockwise direction, as seen in Figs. 3 and 5, causing the upper end 97 of the cam to move farther around the stationary inclined surface 98 on the plate 82, and thus increases the movement of the carriage with the drill holder 66 toward the grinding wheel. The amount of axial clearance produced on the drill point is thus increased as the grinding wheel is moved outwardly, radially of the drill point.

The surface 98 is constructed with such inclination relative to the axis of the shaft 78 that it effects the desired axial movement of the drill point at each revolution. The angle of axial clearance may be any desired angle and is usually from 6° to 12°, depending on the character of the drill point. The angle is controlled jointly by the cam 96, the inclined surface 98 and the cam 43. The upper end 97 of the cam 96 is held against the surface 98 by means of a spring 102 connecting the depending member 93 to the cam 96.

In Fig. 7 I show the point of the drill and the relative positions of the grinding wheel 39 in grinding a series of cutting edges on the drill point. The first, or center cutting unit 103 is usually ground with the axis of the grinding wheel 39 at an angle of substantially 59° to the axis of the drill. In grinding this unit, the grinding wheel is swung to the dotted position shown in Fig. 1. The motor carriage and grinding wheel are next swung to the full line position of Fig. 1, and the grinding wheel moves radially to a point where it just clears the central unit 103. The amount to be cut is regulated by the adjusting wheel 38, which moves the motor driving the grinding wheel axially of the drill point. There is thus provided a cutting edge normal to the axis of the drill. When this cutting edge is ground, other cutting edges may be similarly produced by moving the grinding wheel radially outward of the drill. The final cutting edge 106 is preferably a bevelled cutting edge which is produced by again swinging the motor carriage to the dotted position of Fig. 1 and moving the grinding wheel outwardly of the drill to the outer position shown in Fig. 7. It may be found desirable to grind only three cutting units for the drill point, that is, the central pilot unit 103, the cutting unit 104 normal to the axis of the drill, and to grind the remainder as a conical cutting unit. Auxiliary flutes 107 are finally separately ground on the unit 103 on the small grinding wheel 35 to merge into the main flutes 108 of the drill point.

While I have illustrated and described my invention in connection with grinding a two fluted drill, it will be evident that it may be employed for grinding a drill having any number of flutes other than two by changing the ratio between the gears 73, 76 and 79. For example, if grinding a three fluted drill, the ratio should be such that the counter shaft 78 makes three revolutions to one of the drill holder 66; while a four fluted drill would require four revolutions, and so on.

From the foregoing it will be apparent that I have devised an improved drill grinding apparatus which is adapted to grind twist drills automatically and accurately, and one which is particularly adapted for grinding a plurality of cutting units for the drill point.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. A machine for grinding twist drills comprising a grinding wheel, means to move the drill being ground axially thereof into and out of engagement with the grinding wheel, means to move said grinding wheel radially of said drill, and means responsive to said radial movement to vary the extent of movement of the drill axially into engagement with the grinding wheel to determine the axial clearance.

2. A machine for grinding twist drills comprising a grinding wheel, variable cam means to effect engagement of the drill being ground axially thereof with the grinding wheel, means to move the grinding wheel radially of the drill being ground, means responsive to said radial movement to vary the action of the cam means and thus vary the axial clearance, and spring means to withdraw the drill being ground axially from engagement with the grinding wheel during the grinding operation.

3. A machine for grinding twist drills comprising a grinding wheel, variable cam means to move the drill being ground axially thereof into engagement with the grinding wheel, means to move the grinding wheel radially of the drill being ground, means responsive to said radial movement to increase the movement effected by the cam means as the grinding wheel is moved radially away from the axis of the drill, and spring means to withdraw the drill from the grinding wheel during the grinding operation.

4. In a drill grinding machine, a grinding wheel, means to feed a drill with a rotary motion axially into engagement with the grinding wheel, a cam associated with the feeding means to control the extent of axial movement of the drill toward the grinding wheel, means to vary the position of the grinding wheel radially with respect to the drill point, and means to vary the motion imparted by the cam responsive to the distance of the wheel radially from the drill point.

5. In a drill grinding machine, a grinding wheel, means to feed a drill with a rotary motion axially into engagement with the grinding wheel, a cam associated with the feeding means to control the extent of movement of the drill towards the grinding wheel, means to vary the position of the grinding wheel radially with respect to the drill point, means to vary the motion imparted by the cam responsive to the position of the wheel radially of the drill point, and spring means to withdraw the drill from the wheel at the end of its engagement with each portion of the drill point.

6. In a drill grinding machine, a grinding wheel, means to feed a drill with a rotary motion axially into engagement with the grinding wheel, a cam associated with the feeding means to control the extent of axial movement of the drill toward the grinding wheel, means to vary the position of the grinding wheel radially with respect to the drill point, means to increase the axial motion imparted by the cam responsive to radial outward movement of the grinding wheel with respect to the drill point, and spring means to withdraw the drill axially from the grinding wheel at the end of its engagement with each portion of the drill point.

7. In a drill grinding machine, a bed, a grinding wheel mounted for angular and lateral movement near one end of the bed, a slide mounted on the bed, means to adjust the position of the slide with respect to the grinding wheel, a carriage mounted on the slide and having limited longitudinal movement with respect thereto, frictionless bearings supporting the carriage on the slide, a spring biasing the carriage to the limit of its movement away from the grinding wheel, a drill holder carried by the carriage, mechanism on the carriage to rotate the drill holder, a variable cam carried by the slide, an element carried by the drill holder rotating mechanism and cooperating with the cam to feed the drill axially toward the grinding wheel at each rotation of said element, and means responsive to lateral movement of the grinding wheel on the bed to vary the action of the cam.

8. In a drill grinding machine, a bed, a grinding wheel mounted for angular and lateral movement near one end of the bed, a slide mounted on the bed, means to adjust the position of the slide with respect to the grinding wheel, a carriage mounted on the slide and having limited longitudinal movement with respect thereto, frictionless bearings supporting the carriage on the slide, a spring biasing the carriage to the limit of its movement away from the grinding wheel, a drill holder carried by the carriage, mechanism on the carriage to rotate the drill holder, a variable cam carried by the slide, an element carried by the drill holder rotating mechanism and cooperating with the cam to feed the drill axially toward the grinding wheel at each rotation of said element, and adjustable means responsive to lateral movement of the grinding wheel on the bed to vary the action of the cam.

9. A machine for grinding twist drills according to claim 3, in which the variable cam means to move the drill axially into engagement with the grinding wheel comprises a cam having a single actuating surface and a single contact member therefor.

WALTER F. BANNISTER.